(12) United States Patent
Rockefeller et al.

(10) Patent No.: US 7,948,513 B2
(45) Date of Patent: May 24, 2011

(54) TELECONFERENCING BETWEEN VARIOUS 4G WIRELESS ENTITIES SUCH AS MOBILE TERMINALS AND FIXED TERMINALS INCLUDING LAPTOPS AND TELEVISION RECEIVERS FITTED WITH A SPECIAL WIRELESS 4G INTERFACE

(76) Inventors: Alfred G. Rockefeller, Ramsey, NJ (US); A. Zeki Erdin, Franklin Lakes, NJ (US)

( * ) Notice: Subject to any disclaimer, the term of this patent is extended or adjusted under 35 U.S.C. 154(b) by 1007 days.

(21) Appl. No.: 11/799,783

(22) Filed: May 3, 2007

(65) Prior Publication Data

US 2008/0068445 A1    Mar. 20, 2008

Related U.S. Application Data

(63) Continuation-in-part of application No. 11/521,416, filed on Sep. 15, 2006.

(51) Int. Cl.
*H04N 7/14* (2006.01)
(52) U.S. Cl. ............... 348/14.08; 348/14.02; 348/14.04; 348/14.05; 348/14.09; 379/202.01; 379/205.01; 709/204
(58) Field of Classification Search .................. 370/315; 348/554, 838, 220, 14.08, 14.09, 239; 709/220, 709/208; 455/566, 435.1
See application file for complete search history.

(56) References Cited

U.S. PATENT DOCUMENTS

| | | | | |
|---|---|---|---|---|
| 6,363,069 B1 * | 3/2002 | Levy et al. | | 370/389 |
| 6,647,007 B1 * | 11/2003 | Zoernack | | 370/352 |
| 2002/0044201 A1 * | 4/2002 | Alexander et al. | | 348/14.08 |
| 2002/0140804 A1 * | 10/2002 | Colmenarez et al. | | 348/14.08 |
| 2002/0197993 A1 * | 12/2002 | Cho et al. | | 455/435 |
| 2003/0074443 A1 * | 4/2003 | Melaku et al. | | 709/224 |
| 2003/0217126 A1 * | 11/2003 | Polcha et al. | | 709/220 |
| 2003/0227556 A1 * | 12/2003 | Doyle | | 348/239 |
| 2004/0080610 A1 * | 4/2004 | James et al. | | 348/14.09 |
| 2005/0025043 A1 * | 2/2005 | Mussman et al. | | 370/216 |
| 2006/0077310 A1 * | 4/2006 | Wang et al. | | 348/838 |
| 2006/0194619 A1 * | 8/2006 | Wilcox et al. | | 455/566 |
| 2006/0203758 A1 * | 9/2006 | Tee et al. | | 370/315 |
| 2007/0126884 A1 * | 6/2007 | Xu et al. | | 348/220.1 |
| 2007/0286213 A1 * | 12/2007 | Fodor et al. | | 370/401 |

OTHER PUBLICATIONS

Ken Burn—Ken Burn Effect—2003, all pages.*

* cited by examiner

*Primary Examiner* — Curtis Kuntz
*Assistant Examiner* — Joseph J Nguyen (57) ABSTRACT

A method for providing a videoconferencing service between two fourth generation wireless terminal types including cellular or wireless mobile and fixed terminals, said fixed terminals to include television receivers with a 4G wireless interface, each terminal employing a video camera, a microphone and loudspeaker. All terminal types will be rendered parametrically compatible by use of subscriber tables which identify called terminal parameters and which contain a class of service sequence which identifies the originating terminal's parameters wherein said class of service sequence is sent to the receiving terminal in an alternate caller ID along with selection characters which cause direct routing to the receiving terminal. The called subscriber may opt out of a video send mode by sending a "canned" video frame advising the caller that video is not available.

3 Claims, 7 Drawing Sheets

TELECONFERENCING BETWEEN VARIOUS 4G WIRELESS ENTITIES SUCH AS MOBILE TERMINALS AND FIXED TERMINALS INCLUDING LAPTOPS AND TELEVISION RECEIVERS FITTED WITH A SPECIAL WIRELESS 4G INTERFACE

CONTINUATION-IN-PART OF NON-PROVISIONAL PATENT

Non-Provisional patent application Ser. No. 11/521,416 Exchange of Voice and Video Between two Cellular or Wireless Telephones, Filing Date: 15 Sep. 2006

CROSS REFERENCE TO RELATED APPLICATIONS

Application Number PCT/US2004/031105 Open to View Video Telephony Call in a Wireless Communication Device, International Filing Date: 22 Sep. 2004

This application identifies the concept of exchanging voice and video between two wireless terminals. It identifies the need for a full duplex transmission path, but does not identify the necessity of a particular transmission path configuration or a particular method of call setup. It does not take into account the rather severe limitations imposed by use of existing wireless voice networks for video transmission and does not offer use of new networking concepts and specifications as defined by recent network design (example IEEE 802.16, 802.20, 802.22).

United States Patent Application 0020135671 Image Telecommunication System for Personal Digital Assistant and a Control Method Thereof, Filing Date: 26 Sep. 2002

This application attempts to define the modifications to a personal digital assistant to render the device capable of functioning as a videophone terminal between PDA's, a PDA and a PC and between a PDA and videophone. The application seems not to define the end to end requirements, but rather defines the means to configure the terminal to allow use as a videophone. In this sense, the application seems to be incomplete.

U.S. Pat. No. 6,469,731 Portable Videophone Unit, Filing Date: 22 Oct. 2002

This invention defines the means of providing video continuity when the video stream is interrupted momentarily. This means results in retaining a frame when the succeeding frame is delayed by a specified period. The succeeding frame may be discarded and replaced with the next succeeding frame. This method allows repair of momentarily interrupted video frames by carrying the present frame over one or several succeeding frames. The invention thus narrowly defines a certain aspect of videophone service, but does not define the service itself.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

There are prior patent applications in which the stated objective is the definition of the means of instituting a wireless videophone service. All of these applications take for granted the existence of a suitable transmission path without identifying or defining such a path. The service as defined by these various applications is therefore lacking this essential element. Also lacking is the definition of the specific means of terminal configuration and call set up. These are typically described in vague terms.

The existing wireless communication networks are used for either cellular voice communication or downloading of broadband data, but not both. Voice and broadband applications are supported over separate networks. As yet there is no unique network which will carry both voice traffic and broadband data simultaneously. The IEEE and other entities are developing specifications for a network which may be dynamically configured to carry content of various bandwidths such as voice or broadband data. Implementation of these specifications will result in construction of a network which will carry both voice and broadband data such as streaming video. The new network specifications specifically allow such an arrangement which will include switched connections to various entities satisfying differing and diverse requirements. The new network will be defined as a fourth generation wireless network (4G) and will carry voice and broadband downloaded and uploaded data.

For example, the IEEE 802.16 series of specifications defines a broadband network using Orthogonal Frequency Division Multiple Access technology (OFDMA). This new network will be defined as a fourth generation wireless network (4G). Use of this new technology will satisfy requirements for voice, data downloading, data uploading and full duplex data exchange on one network by allowing the subscriber station to initiate configuration of the bandwidth necessary for multiple uses. The originating subscriber station will be able to contend for more bandwidth by employing a "Bandwidth Request" (IEEE 802.16) which will be recognized by the network. The network will then configure the communication channel with the necessary bandwidth and acknowledge that fact to the subscriber station.

Deployment of the new 4G network will greatly facilitate inauguration of a new service which will allow the subscriber terminal to select the proper bandwidth to satisfy requirements for all wireless services including exchange of video and voice. This specification will deal with the process of defining this new video service based on the new wireless network specifications.

BRIEF SUMMARY OF THE INVENTION

This specification explains the requirements and method for the exchange of streaming video and voice between two wireless terminals. Since streaming video exchange is not practical using existing 2G and 3G cellular networks because of network congestion problems, 4G network technology must be employed. This technology is in the process of development via open network definition (such as IEEE 802.16). Implementation of this 4G network will supply the means of satisfying the specific desired application of the exchange of voice and video between two wireless terminals. This specification lists network call set-up requirements and also lists the process and requirements necessary for interfacing various terminal types including mobile terminals and fixed terminals such as television receivers which will employ separate wireless 4G interfaces to allow teleconferencing between various terminal types.

Other applications such as video surveillance may also be implemented over the new network by the similar means.

BRIEF DESCRIPTION OF THE SEVERAL VIEWS OF THE DRAWINGS

FIG. 1 represents a view of a wireless mobile terminal showing a table of video contacts displayed on the terminal screen.
  1.1 Depiction of a wireless terminal.
  1.2 Depiction of individual video contacts displayed on terminal screen.
  1.3 Depiction of video camera lens on wireless terminal
FIG. 2 shows an individual routing table matched with each entry in video contact table.
  2.1 tttt at represents a terminating terminal parameter entry which will be used during originating terminal call set up to match originating terminal parameters to terminating terminal parameters.
  2.2 bbbb is a bandwidth request code which will be used during call set up to request the proper network bandwidth configuration.
  2.3 cccc represents a Class of Service character sequence to be sent to the network. This sequence will cause the network to select an alternate caller ID table which will be passed on to the terminating terminal preceded with the class of service sequence. This sequence will be decoded by the receiving terminal logic and will yield originating terminal parameters to which the receiving terminal will render itself compatible.
  2.4 sssssssss represents the receiving terminal network address. Length of character strings are for illustrative purpose only and may not represent actual length.

DETAILED DESCRIPTION OF THE INVENTION

Figures 1, 2:
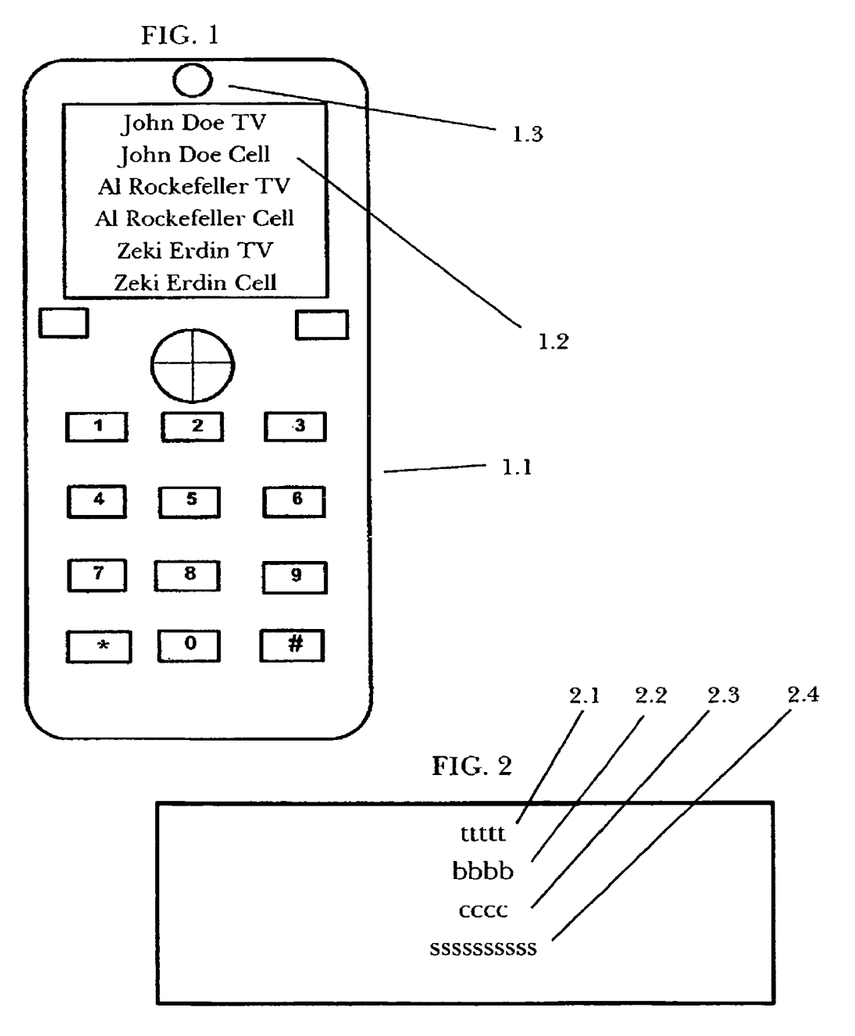
Figure 3:
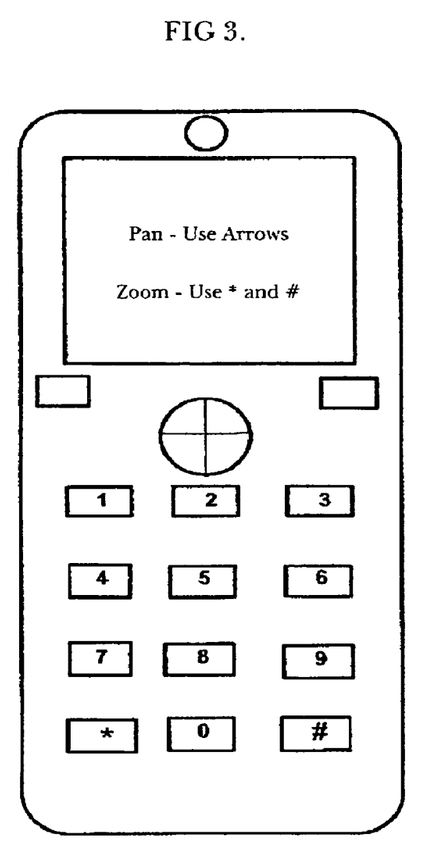
FIG. 3 represents a view of an originating mobile terminal during call set up in which decoding of sequence tttt has resulted in screen messages telling of the availability of terminating pan and zoom capabilities and the proper terminal keys to use to employ these features.
Figure 4:
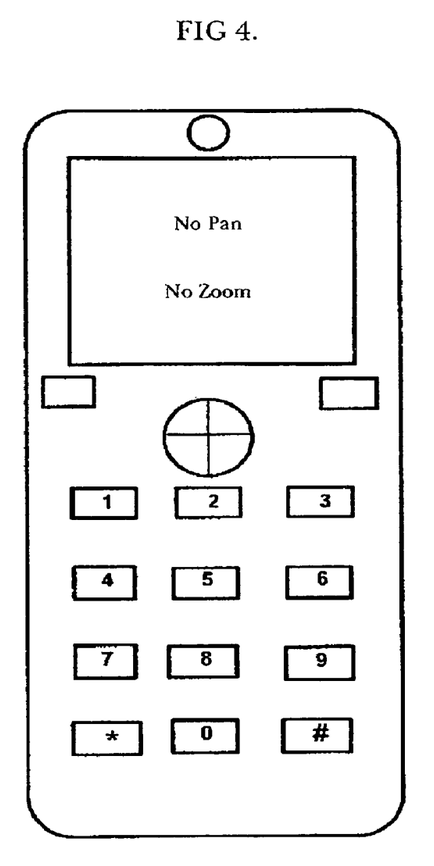
FIG. 4 represents a view of an originating mobile terminal during call set up in which decoding of sequence tttt has resulted in screen messages telling of the non-availability of pan and zoom capabilities in the terminating terminal.
Figure 5:
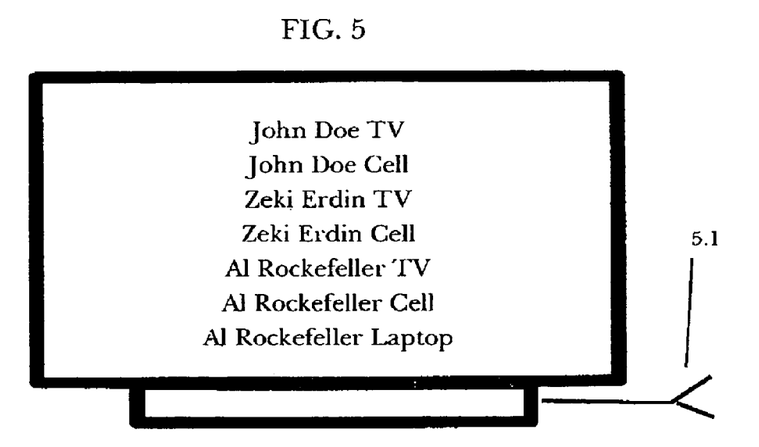
FIG. 5 depicts a fixed television terminal screen showing a table of video contacts.
  5.1 Depiction of a cable connecting the television terminal to videoconferencing interface (6.4).
Figure 6:
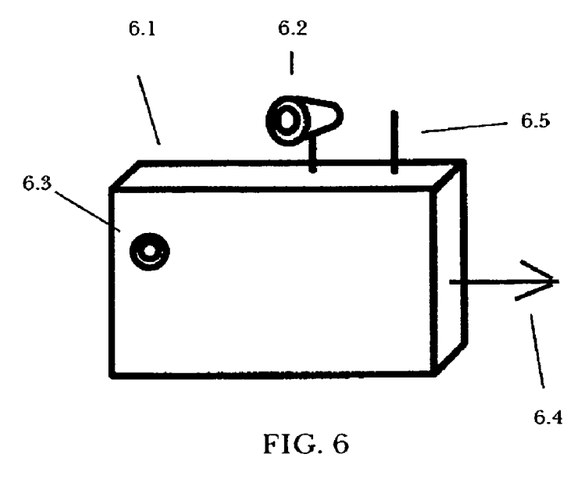
FIG. 6 depicts a videoconferencing interface between the 4G wireless network and a television receiver.
  6.1 Depiction of an interface box. This is conceptual only since interface logic and components may be packaged alone or in combination with other entities.
  6.2 Depiction of a television camera with pan and zoom capability.
  6.3 Microphone as part of terminal interface.
  6.4 Depiction of cable interconnection between interface video and audio and the television video and audio.
  6.5 Depiction of 4G antenna on interface.
Figure 7:
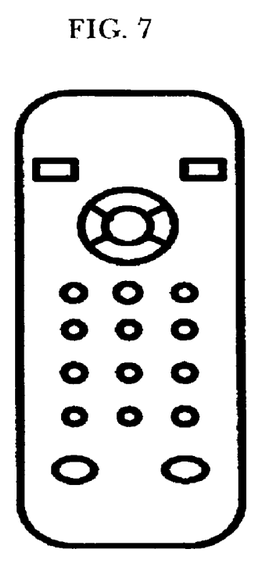
FIG. 7 depicts a remote control unit used for controlling interface box functions.
Figure 8:
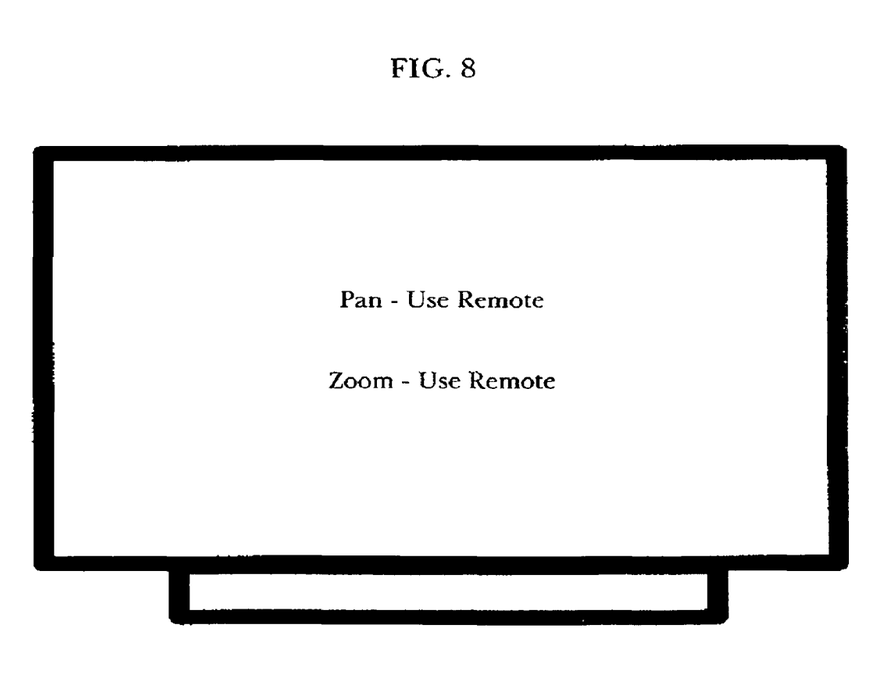
FIG. 8 depicts television screen messages during call set up when terminating pan and zoom is allowed and television interface is used in originating mode.
Figure 9:
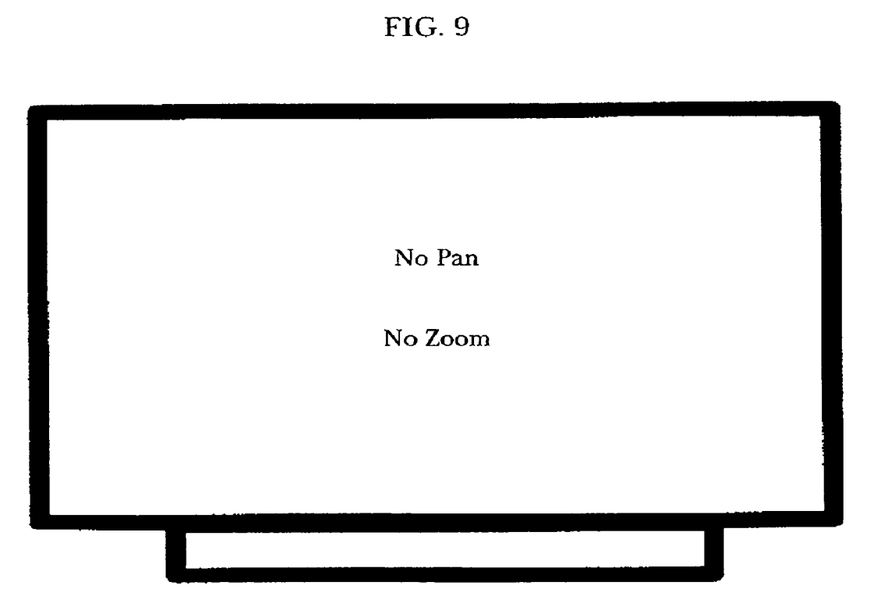
FIG. 9 depicts television screen messages during call set up when terminating pan and zoom is not allowed and television interface is used in originating mode.
Figure 10:
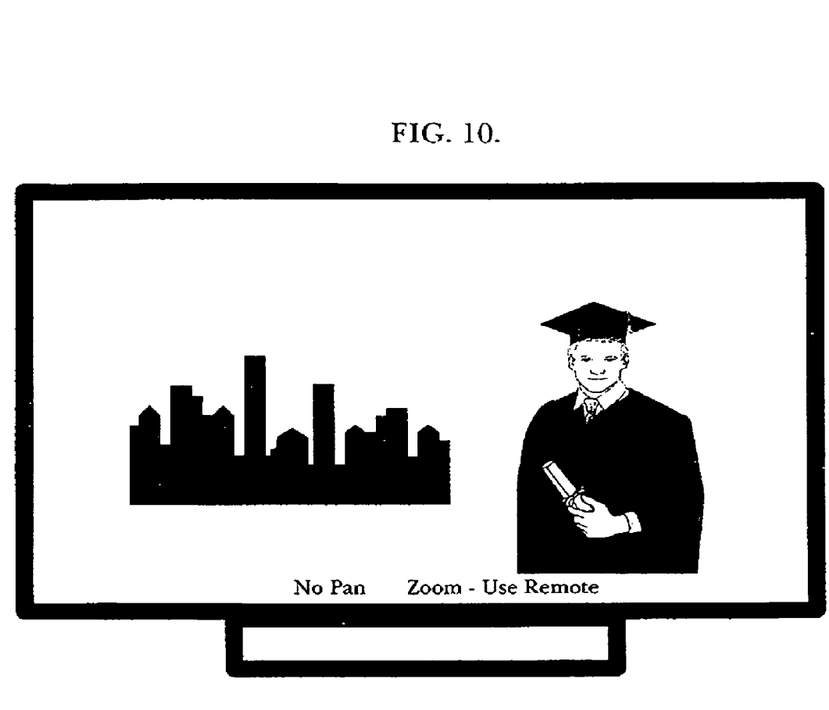
FIG. 10 depicts a connected television terminal video call in which pan and zoom instructions are at bottom of screen.
Figure 11:
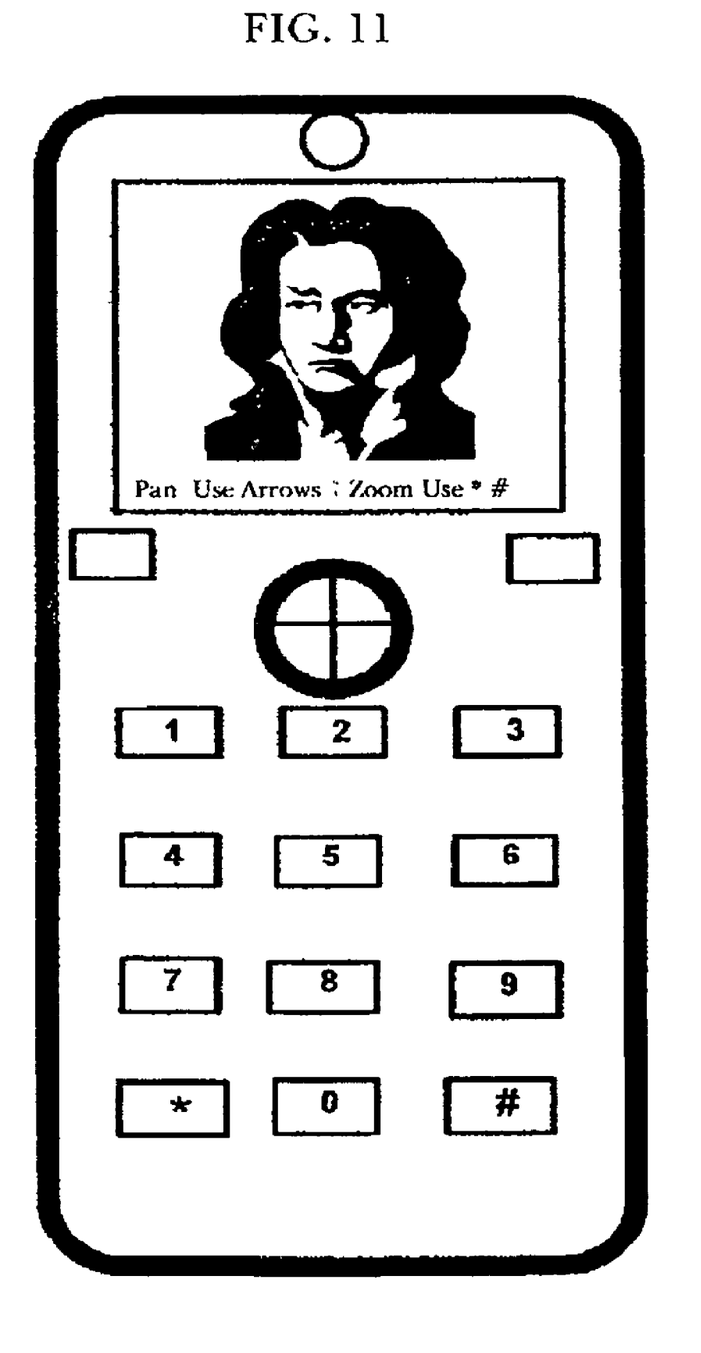
FIG. 11 depicts a connected mobile terminal video call in which pan and zoom instructions are at bottom of screen.

The present wireless networks are configured for either cellular voice use (2g and 3G) or for higher speed data including downloads from the Internet, video downloads and music downloads. Please note that the voice and broadband data functions presently are carried on separate networks which are configured for voice and text only (2G and 3G) or downloaded broadband data only.

The latter presently is being achieved by use of broadband wireless networks such as UMTS, EV-DO and WCDMA, all based on 3G technology. These networks are designed to facilitate downloading of high speed data to both fixed and mobile users using new broadband interfaces built into wireless terminals. New 4G networks such as specified by IEEE 802.16 are in process of implementation by various wireless carriers but are not yet active and have not undergone load tests. These new network specifications allow extensions of WI-FI (IEEE 802.11) and inclusion of both long range fixed and mobile wireless communication using new technology to achieve greater bandwidth. An example of this is OFDMA (Orthogonal Frequency Division Multiple Access) technology which will allow dynamic bandwidth allocation so that the network may carry voice, video, Internet download and high speed data. IEEE 802.16 provides the building blocks for creation of a new network which will replace the existing voice and broadband wireless networks with one (4G) network. This new network will fulfill all of the functions of the two existing network types. This new technology will use existing mobile cellular towers to allow a seamless phased cutover to the new network from existing 2G, 3G and broadband networks. Additional antennas may be implemented to interface non-mobile terminals. All mobile and fixed terminals may be integrated into one switched network. The new 4G network will support voice, broadband data and real time streaming video exchange between wireless terminals. Dynamic bandwidth allocation inherent in the new network will allow efficient use of spectrum to support both voice and higher speed data requirements. The deployment of this new network will allow real time full duplex streaming video and voice exchange between wireless terminals including both mobile terminals and terminals fixed in one location. The thrust of this specification is the development of such a service.

This new service will interconnect various terminal types including television terminals employing differing aspect ratios, fixed wireless terminals and hand held mobile terminals. In any connection employing mutual video transfer, both originating and terminating terminals will have to be aware of the other terminal's type so that aspect ratios may be adjusted in both terminals' video camera outputs. In addition, terminals with moveable video cameras may have the cameras panned and zoomed by remote command from the opposite terminal, while mobile hand held terminals with fixed video cameras must be panned manually by verbal request via the opposite terminal's voice stream.

Mobile wireless terminals will be equipped with a digital video camera. A microphone and speaker will allow a speaker phone mode to be employed automatically upon exercising of the video option. Video will be displayed on a color screen as presently used for interfacing Internet entities and downlink video. Each terminal will be equipped with send and receive capability to exchange both voice and video.

Fixed terminals may be laptop terminals interfacing the 4G network or television receivers which will employ a new 4G interface. The television interface will perform on the network as a 4G terminal equipped with a zoomable and pannable video camera and a microphone. It will employ the same routing capability and functionality as a mobile terminal, but subscriber selection and call request will be achieved via a remote control unit. The television interface will interface the television video and sound inputs via A/B switch or alternate DC inputs. The television user will employ the remote control device to control the television interface to achieve call set up and to control video options.

Video cameras in all terminals will be configured to output video in the video aspect ratio used in the opposite terminal based on the terminal type listed on the routing table for originating terminals and the Class of Service code received by terminating terminals. Similarly, each terminal will be aware of the pan—zoom capability of the opposite terminal.

Selection of the video option on the originating terminal will be table driven. Each user's wireless terminal will contain a list of his contacts who have the video option. All entities in the individual user's video calling group will be displayed on a viewable table. Each video option table entry will be associated with a routing table which contains the terminal type and selection number of the terminating subscriber, a Class of Service code which identifies the terminal type and options employed in the originating terminal and an appropriate bandwidth request code (IEEE 802.16).

For either mobile or fixed terminals, selecting the table entry and pressing the "call" button will cause the originating subscriber terminal to set up the appropriate configuration for interfacing the terminating terminal, to select the 4G network and send the bandwidth request code. The bandwidth request code will signal the network to assign the proper bandwidth. Implementation of network configuration will be acknowledged by the network. The terminal will then send selection and the Class of Service Code. The Class of Service code will cause the network to access an alternate video "caller ID" database in which the originator is identified as a video subscriber. The individual video "caller ID" will contain a terminating class of service code which will be downloaded to the terminating terminal as part of the "caller ID" package after call routing. Receipt of the class of service code by the terminating terminal will cause it to configure itself for video mode and make it aware of the originator's terminal type and configuration. Both terminals will be aware of the other terminal's type and aspect ratio and will set up options accordingly. Terminal logic will select a ring tone unique to video service for mobile terminals and a ring tone and/or message displayed on fixed terminal screens.

For mobile terminals and laptops, the called party will answer in the usual manner. Fixed terminals interfacing television receivers will be answered via remote control function. After call connect, both originator and receiver will be put into video mode. Mobile terminals and laptops will enter speaker phone mode automatically.

Fixed television interfaces will connect incoming audio signals to the fixed terminal speakers via spare audio inputs. Audio output will from the microphone will enter the interface and will be connected to the 4G audio path. For all terminals, video will be displayed on both forward and backward paths after call connection unless the recipient finds it inconvenient to send video, in which case he may select a voice only keyed option. This will allow the recipient to receive video from the originator. The originator will receive a "canned" video frame which will inform him that the recipient has opted out of the video send mode. The recipient may reenter the video mode via another keyed option.

Both participating entities will frame themselves in the video camera field of view and, in turn, speak into the microphone. Both the speech and video will be sent to the other entity. Video will be displayed on each terminal screen. The video camera on each terminal may be panned and zoomed by command from the other terminal if that option is available. A prompt displayed on the terminal screen of a subscriber will inform him of the ability to pan and zoom. This will be accomplished by fixed terminal remote control or mobile terminal keypad. For hand held terminals, the range and sensitivity of the microphone will allow exchange of speech when the video camera is oriented away from the subscriber.

Transmission will be in the full-duplex mode to allow video to be observed on both terminals simultaneously. Speech will follow the present cellular or wireless transmission rules.

Ending the call will involve clearing via disconnect button on the mobile or laptop terminal or via remote control disconnect button for television interfaces.

Mobile terminals will be able to operate as a cellular or wireless terminal in all normal modes of operation when not employing the video and voice exchange option. Selection of addresses outside the special table will cause a connection in the normal cellular or wireless mode. The special table may contain entities marked with a different class of service code and bandwidth request unique to a different type of broadband service. Voice service may be defined by a bandwidth request code as well, but may be selected by either table or selection digits.

Table generation may be done on separate facilities and down-loaded to individual cellular or wireless terminals or may be done individually on the terminal. The individual routing table may be used also to set up terminal parameters to employ differing protocols and/or compression/decompression algorithms as needed for other wireless services. The terminating terminal will configure itself based on the class of service information set up by the originating terminal routing table and subsequently sent to the terminating terminal in the caller ID package forwarded to the terminating terminal during session set up. The bandwidth request and class of service codes sent by the originating terminal may be configured for various other uses. These may include return of streaming video from other types of terminations such as terminals used for surveillance. In this case, video and sound will be unidirectional from the terminating terminal to the originating terminal and broadband service will exist in the downlink while the uplink will be configured for voice bandwidth. These differing uses may be supported by the same routing table used for video exchange with options linked to the individual table entry.

Prior to full subscriber migration to the 4G network, the subscriber terminal may be configured to employ the existing 2G or 3G network for voice and text messages. This will require dual frequency subscriber terminals to access 2G, 3G, and 4G networks.

Terminals may be configured to support the video option on various transmission facilities which may be integrated with the new 4G network. These will include mobile broadband wireless networks, fixed "wireless city" networks (including "Hot spot" interfaces with 802.11) and "wireless city" networks interconnected with other "wireless city" networks by satellite link or fiber optic link. Interconnection of mobile and stationary wireless terminals into one network will allow voice and video communication between both fixed and mobile network entities.

The invention claimed is:

1. A method of videoconferencing service utilizing fourth generation wireless technology to provide full duplex exchange of digital streaming video and sound comprising:

two terminals, each selected from a group containing television receivers and cellular telephones and wireless terminals and laptops, wherein each terminal equipped with a display screen, a fourth generation wireless cellular network interface, a digital video camera, a microphone, a loudspeaker and a logic device employing subscriber routing tables wherein selection of a terminating video subscriber routing table address causes a 4G terminal originating a video call to instruct a 4G network to set up a 4G communication channel with the bandwidth necessary to support streaming video and sound on a full duplex basis;

to configure an originating terminal to carry full duplex video and sound and to be parametrically compatible with the terminating terminal;

to provide routing information to the fourth generation wireless cellular network, wherein each user's wireless terminal will contain a list of his contacts who have a video option wherein all entities in the individual user's video calling group will be displayed on a viewable table and each video option table entry will be associated with a routing table which contains the terminal type and selection number of the terminating subscriber, a Class of Service code which identifies the terminal type and options; and to send the Class of Service code to the 4G network which is forwarded to the terminating terminal in an "alternate caller ID" which tells the terminating terminal to set up terminal parameters matching those of the originating terminal, to support streaming video and audio on the full duplex basis and to enable an alternate ring tone, wherein the alternate ring tone is unique to the video service and message displayed on fixed terminal screens; and to answer the video call either in a mode which allows the terminating terminal to send video and sound or alternately in another mode in which the terminating terminal sends sound along with a "canned" video frame which informs that the called subscriber has opted out of the video send mode.

2. The method of videoconferencing service of claim 1 wherein the logic device in each terminal causes a display of selection from a group containing terminal keys and television remote control to control panning and zooming functionality of the video camera in each opposite terminal wherein the functionality is activated after connection is achieved.

3. The method of videoconferencing service of claim 2 wherein each connected terminal displays the panning and zooming capability of the opposite connected terminal.

* * * * *